United States Patent
Brown et al.

(10) Patent No.: US 9,751,398 B2
(45) Date of Patent: Sep. 5, 2017

(54) FUEL TANK GROUND ASSEMBLY

(71) Applicant: Deere & Company, Moline, IL (US)

(72) Inventors: Jeffery K. Brown, Dike, IA (US);
Jeffrey L. Gardner, Hudson, IA (US)

(73) Assignee: DEERE & COMPANY, Moline, IL (US)

(*) Notice: Subject to any disclaimer, the term of this patent is extended or adjusted under 35 U.S.C. 154(b) by 603 days.

(21) Appl. No.: 14/315,428

(22) Filed: Jun. 26, 2014

(65) Prior Publication Data
US 2015/0375615 A1 Dec. 31, 2015

(51) Int. Cl.
*H05F 3/00* (2006.01)
*B60K 15/04* (2006.01)
*B60K 15/03* (2006.01)

(52) U.S. Cl.
CPC .... *B60K 15/0406* (2013.01); *B60K 15/03177* (2013.01); *B60K 15/04* (2013.01); *B60K 2015/03401* (2013.01); *B60K 2015/03486* (2013.01); *B60K 2015/03493* (2013.01); *B60K 2015/0432* (2013.01)

(58) Field of Classification Search
CPC .................................................. B60K 15/0406
USPC ........................................................ 361/215
See application file for complete search history.

(56) References Cited

U.S. PATENT DOCUMENTS

| | | | | |
|---|---|---|---|---|
| 4,540,191 A * | 9/1985 | Hoch | ..................... | B60K 15/00 280/834 |
| 5,898,560 A * | 4/1999 | Flaynik, Jr. | ............ | B01D 35/02 361/212 |
| 6,945,290 B1 | 9/2005 | Benjey et al. | | |
| 7,042,695 B2 * | 5/2006 | Przytulla | .................. | B65D 1/12 361/215 |

* cited by examiner

*Primary Examiner* — Stephen W Jackson

(57) ABSTRACT

A grounded fuel tank assembly includes a non-metallic fuel tank having a container and a hollow filler neck, a fuel cap with a hollow stem, and an electrically conductive insert member. The insert member includes a hollow sleeve which is received by the neck, an annular frusto-conical first ring which is joined to an end of the sleeve, and a second ring which extends away from the first ring and which at least partially surrounds a portion of the neck. The sleeve has internal and external sleeve threads formed thereon. The internal sleeve threads engages external cap threads, and the external sleeve threads engages internal neck threads. An electrically conductive ground strap is exterior to the container and engages the second ring. The insert includes tabs which engage the neck to prevent rotation of the insert.

19 Claims, 3 Drawing Sheets

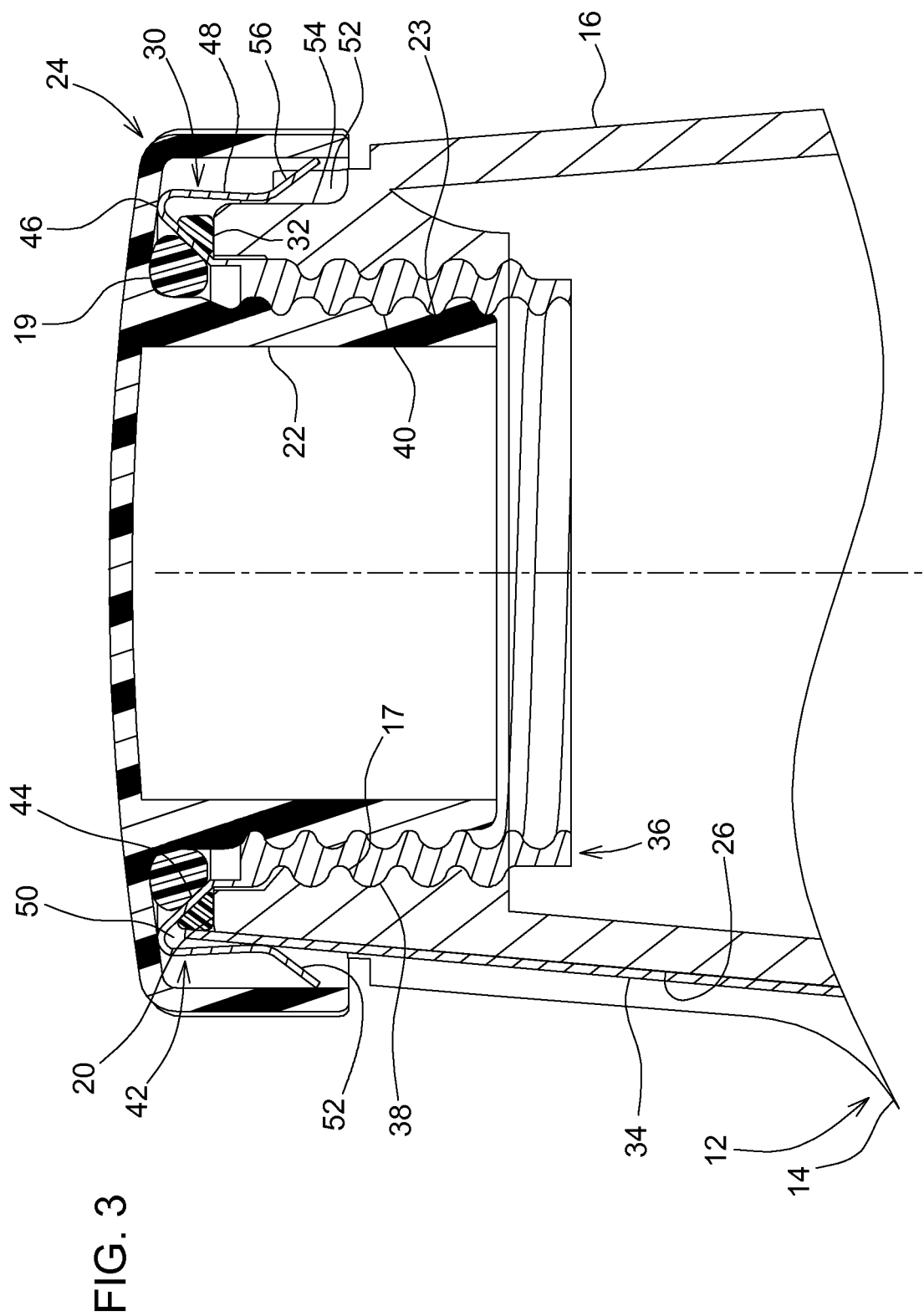

FUEL TANK GROUND ASSEMBLY

FIELD

The present disclosure relates to a vehicle fuel tank ground assembly so as to prevent the buildup of static electricity.

BACKGROUND

Fuel flowing from a hose or container into an ungrounded fuel tank or movement of fuel within the tank can cause the formation of a static charge. Regulations, such as SAE J1645, require grounding of a fuel tank so as to eliminate static charge buildup. U.S. Pat. No. 4,540,191, issued in 1985 to Hoch, and assigned to the assignee of the present application, shows a fuel tank which is grounded to a vehicle chassis by means including a metal filler neck portion forming a sole electrical conducting portion of the tank, a metal vent tube connected between the metal filler neck portion and a metal tank mounting bracket secured to the vehicle chassis and a ground cable or wire connected to the filler neck portion and dangling into the tank. However, most fuel tanks are made entirely of a non-metallic material such as plastic. It is desired to provide a grounding assembly to prevent a static charge buildup for a non-metallic fuel tank which does not have a metal filler neck. Some fuel tanks are internally grounded by a metal insert which is connected to the body of the fuel sender via a metal wire/cable, but such tanks are difficult to assemble and service.

SUMMARY

According to an aspect of the present disclosure, a grounded fuel tank assembly includes a fuel tank having a non-metallic container and a non-metallic filler neck. The neck has an opening surrounded by a lip. The neck has internal neck threads formed thereron. A fuel cap includes a hollow stem with external cap threads formed thereon. The assembly also includes an electrically conductive insert member and an electrically conductive ground strap.

The insert member has a hollow cylindrical sleeve which is received by the neck, an annular frusto-conical first ring which is joined to an end of the sleeve, and a second ring which extends away from the first ring and which at least partially surrounds a portion of the neck. The sleeve has internal and external sleeve threads formed thereon. The internal sleeve threads engage the external cap threads, and the external sleeve threads engage the internal neck threads.

The ground strap is exterior to the container and engages the second ring. The container member is attached to the sleeve and extends into the container. A portion of the neck is surrounded by a plurality of evenly spaced fingers which are separated by a corresponding plurality of upwardly opening slots. The insert includes a plurality of tabs which project away from an outer edge of the second ring. Each tab is bendable into a corresponding one of the slots to prevent rotation of the insert and hold the insert onto the neck. A portion of the ground strap is held between the outer surface of the neck and the second ring. The first and second rings surround an annular recess which opens towards the lip of the neck 16 and which receives the lip.

An O-ring seals between the lip and the insert and a further O-ring seals between the insert and the cap. As the insert is screwed into the neck, a constant force pushes the grounding strap inwardly towards the neck. A channel or groove is molded into the tank to locate the strap in a defined position and to resist strap rotation while installing the insert. The groove has room for a robust ground strap that is less susceptible to damage and entanglement than a grounding wire. The result is a grounded fuel tank assembly which is simple to put together.

BRIEF DESCRIPTION OF THE DRAWINGS

FIG. 3 is a sectional view taken along a center line of the ground strap of FIG. 1.

DETAILED DESCRIPTION OF THE DRAWINGS

Figure 1:
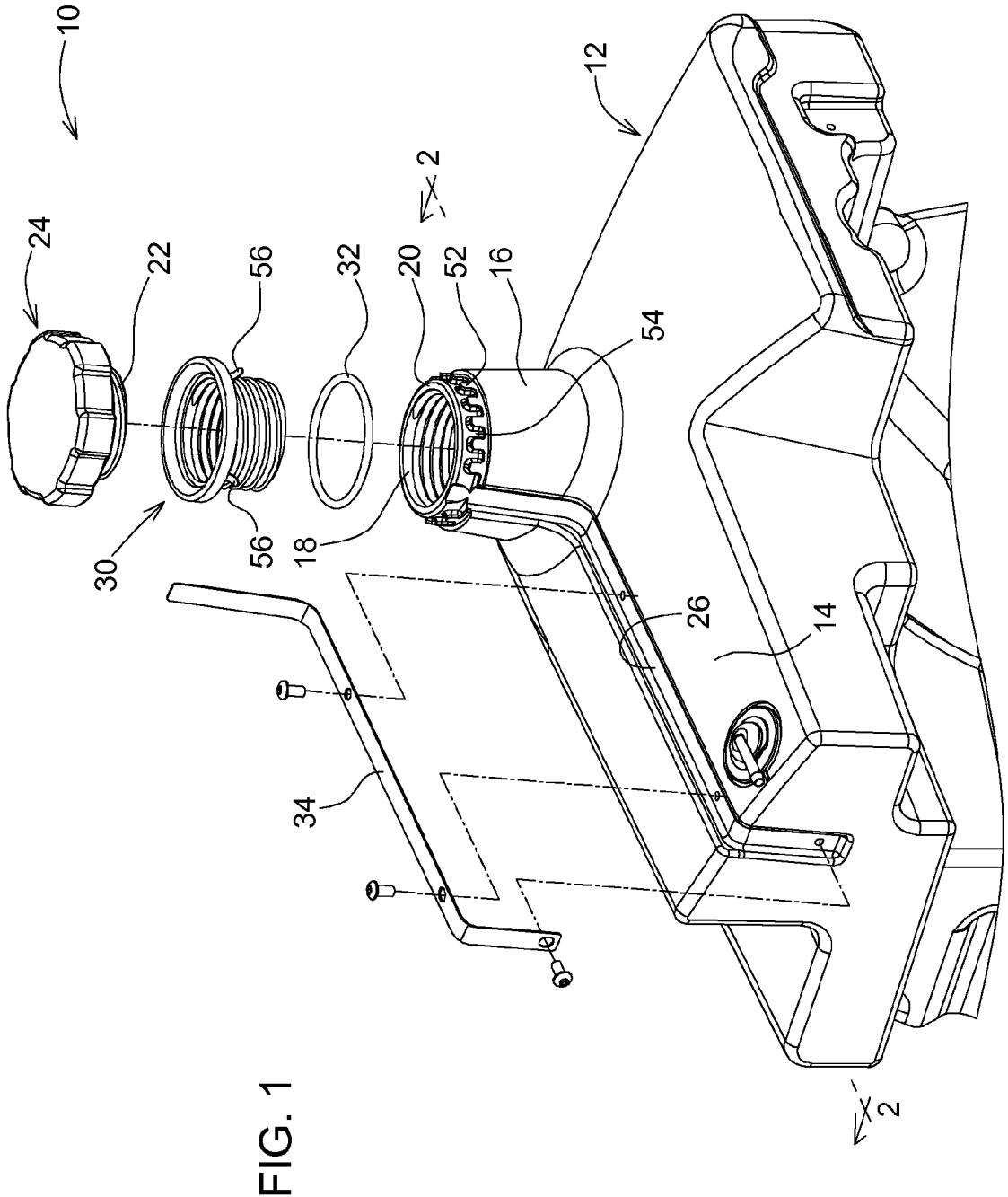
FIG. 1 is a perspective view of an upper portion of a fuel tank showing a ground assembly embodying the invention.

Referring to FIG. 1, a grounded fuel tank assembly 10 includes a fuel tank 12 which has a container or tank 14 and a hollow filler neck 16 which projects from the container 14. The neck 16 has an opening 18 which is surrounded by a lip 20. The opening 18 is adapted to receive the hollow shank or stem portion 22 of a fuel cap 24. An O-ring 19 is mounted around a base portion of the shank 22. The shank portion 22 includes external threads 23. A groove 26 is formed in the outer surface of the tank 14 and the neck 16. The assembly 10 also includes an insert member 30, and O-ring 32 and a ground strap 34. The ground strap 34 is received by the groove 26. Alternatively, a wire (not shown) in a molded channel could also be used, or a conductor could be molded into the tank to complete the grounding system between the metal fuel fill insert a vehicle ground.

Figure 2:
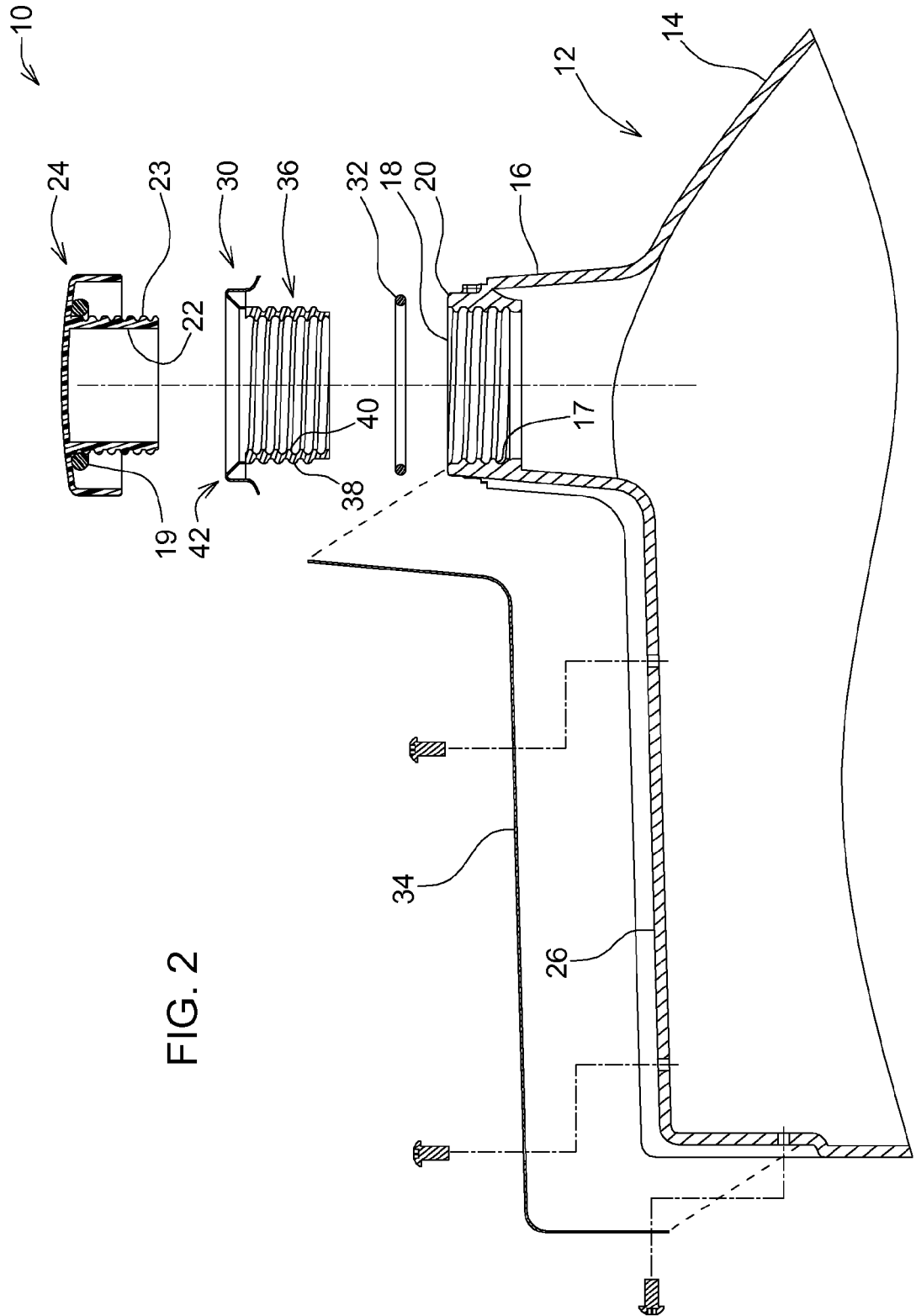
FIG. 2 is a perspective view of the insert of FIG. 1.

Referring to FIGS. 2 and 3, the neck 16 includes internal threads 17. The insert member 30 is an electrically conductive, hollow, cylindrical member. The insert member 30 has a hollow cylindrical inner part or sleeve 36 which is received by the neck 16. The sleeve 36 includes external threads 38 which engage the internal threads 17 of the neck 16. The sleeve 36 also includes internal threads 40 which engage the external threads 23 of the shank 22 of cap 24.

The insert member 30 also has a ring-shaped outer part 42. The outer part 42 is joined to an end of the sleeve 40. The outer part 42 includes an annular frusto-conical inner ring 44 which is joined to an end of the sleeve 40 and which extends axially away and radially outwardly from sleeve 40 to a curved outer rim 46. The outer part 42 also includes an outer ring 48 which extends axially away from the rim 46 and towards the sleeve 40. The outer part 42 thereby forms an annular recess 50 which opens away from the rim 46 and towards the lip 20 of the neck 16.

As best seen in FIG. 3, the outer part 42 receives the lip 20 of the neck 16 and the O-ring 32. Thus, the O-ring 32 forms a seal between the lip 20 and the ring 44 of outer part 42. The O-ring 19 forms a seal between the cap 24 and the ring 44 of insert 30. The outer part 42 also receives an end of the ground strap 34 so that the strap 34 makes electrical contact with the outer ring 48. A plurality of spaced apart tabs 56 project away from an outer edge of the ring 48.

As best seen in FIG. 4, an upper portion of the neck 16 is surrounded by a plurality of evenly spaced fingers 52 which are separated by a corresponding plurality of upwardly opening slots 54. Each tab 56 can be bent into a corresponding one of the slots 54 to prevent the insert 30 from being rotated and unscrewed from the neck 16.

Thus, this assembly includes an insert member 30 which has external threads 38 for securing it to the molded plastic tank 12, internal threads 40 for securing the cap 24, and tabs 56 which engage the neck 16 to prevent unscrewing of the insert 30.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A grounded fuel tank assembly comprising:
a fuel tank having a non-metallic container and a non-metallic filler neck, the neck having an opening surrounded by a lip, the opening being adapted to receive a portion of a fuel cap;
an electrically conductive insert member, the insert member having an inner part which is received by the neck and a ring-shaped outer part which at least partially surrounds a portion of the neck; and
an electrically conductive ground strap exterior to the container, the strap engaging the outer part, the strap extending along an outer surface of the container and along an outer surface of the neck.

2. The grounded fuel tank assembly of claim 1, wherein:
the outer part forms an annular recess which receives the lip; and
the strap has an end which engages the insert and which is received by the annular recess.

3. The grounded fuel tank assembly of claim 1, wherein:
a portion of the neck is surrounded by a plurality of evenly spaced fingers which are separated by a corresponding plurality of upwardly opening slots; and
the insert includes a plurality of tabs which project away from an outer edge of the outer part, each tab being bendable into a corresponding one of the slots to hold the insert onto the neck.

4. The grounded fuel tank assembly of claim 1, wherein the insert member comprises:
a hollow cylindrical sleeve which is received by the neck;
an annular frusto-conical first ring which is joined to an end of the sleeve; and
a second ring which extends away from the first ring and which at least partially surrounds a portion of the neck.

5. The grounded fuel tank assembly of claim 1, wherein:
the insert member comprises a hollow cylindrical sleeve which is received by the neck, the sleeve having external threads formed thereon; and
the neck having internal threads which engage the external threads formed on the neck.

6. The grounded fuel tank assembly of claim 1, wherein:
the cap includes a hollow stem, the stem having external threads formed thereon; and
the insert member comprises a hollow cylindrical sleeve which is received by the neck, the sleeve having internal threads formed thereon, said internal threads engaging the external threads of the stem.

7. The grounded fuel tank assembly of claim 1, wherein:
a portion of the ground strap is held between the outer surface of the neck and the outer part.

8. The grounded fuel tank assembly of claim 1, wherein:
an O-ring seal sealingly engages the lip and the insert.

9. The grounded fuel tank assembly of claim 8, wherein:
a further O-ring seal sealingly engages the cap and the insert.

10. The grounded fuel tank assembly of claim 2, wherein:
an O-ring seal is received by the recess and sealingly engages the lip and the insert.

11. A grounded fuel tank assembly comprising:
a fuel tank having a non-metallic container and a non-metallic filler neck projecting from the container, the neck having an opening surrounded by a lip, the opening being adapted to receive a portion of a fuel cap;
an electrically conductive ground strap which extends along an outer surface of the container and along an outer surface of the neck, the strap engaging the outer part, an end of the strap is held between the outer surface of the neck and the outer part; and
an electrically conductive insert member, the insert member having an inner part which is received by the neck and a ring-shaped outer part which engages the strap, the outer part forming an annular recess which receives the lip and the end of the strap.

12. The grounded fuel tank assembly of claim 11, wherein:
a portion of the neck is surrounded by a plurality of evenly spaced fingers which are separated by a corresponding plurality of upwardly opening slots; and
the insert includes a plurality of tabs which project away from an outer edge of the outer part, each tab being bendable into a corresponding one of the slots to prevent the insert from rotating with respect to the neck.

13. The grounded fuel tank assembly of claim 11, wherein the insert member comprises:
a hollow cylindrical sleeve which is received by the neck;
an annular frusto-conical first ring which is joined to an end of the sleeve; and
an outer second ring which extends axially away from the first ring and towards the sleeve, the annular recess being formed between the first and second rings.

14. The grounded fuel tank assembly of claim 11, wherein:
the insert member comprises a hollow cylindrical sleeve which is received by the neck, the sleeve having external threads formed thereon; and
the neck having internal threads which engage the external threads formed on the neck.

15. The grounded fuel tank assembly of claim 11, wherein:
the cap includes a hollow stem, the stem having external threads formed thereon; and
the insert member comprises a hollow cylindrical sleeve which is received by the neck, the sleeve having internal threads formed thereon, said internal threads engaging the external threads of the stem.

16. The grounded fuel tank assembly of claim 11, wherein:
an O-ring seal sealingly engages the lip and the insert; and
a further O-ring seal sealingly engages the cap and the insert.

17. A grounded fuel tank assembly comprising:
a fuel tank having a non-metallic container and a non-metallic filler neck, the neck having an opening surrounded by a lip, the neck having internal neck threads formed thereron;

a fuel cap, the cap including a hollow stem, the stem having external cap threads formed thereon;

an electrically conductive insert member, the insert member having a hollow cylindrical sleeve which is received by the neck, an annular frusto-conical first ring which is joined to an end of the sleeve, and a second ring which extends away from the first ring and which at least partially surrounds a portion of the neck, the first and second rings surround an annular recess which opens towards the lip of the neck, the sleeve having internal and external sleeve threads formed thereon, the internal sleeve threads engaging the external cap threads, and the external sleeve threads engaging the internal neck threads; and an electrically conductive ground strap exterior to the container, the strap engaging the second ring.

18. The grounded fuel tank assembly of claim 17, wherein:

a portion of the neck is surrounded by a plurality of evenly spaced fingers which are separated by a corresponding plurality of upwardly opening slots; and the insert includes a plurality of tabs which project away from an outer edge of the second ring, each tab being bendable into a corresponding one of the slots to hold the insert onto the neck.

19. The grounded fuel tank assembly of claim 17, wherein:

a portion of the ground strap is held between the outer surface of the neck and the second ring.

* * * * *